UNITED STATES PATENT OFFICE.

HENRY G. TYER AND JOHN HELM, OF NEW BRUNSWICK, NEW JERSEY.

IMPROVEMENT IN THE MANUFACTURE OF INDIA-RUBBER GOODS BY MEANS OF ZINC COMPOUNDS.

Specification forming part of Letters Patent No. 6,066, dated January 30, 1849; Reissue No. 141, dated August 7, 1849.

*To all whom it may concern:*

Be it known that we, HENRY GEORGE TYER and JOHN HELM, of New Brunswick, in the county of Middlesex, in the State of New Jersey, have invented a new and Improved Composition of Caoutchouc, Zinc, and Sulphur; and we do hereby declare that the following is a full and exact description of the manner of compounding the same.

The nature of our invention consists in forming a compound of caoutchouc, carbonate of zinc, or other preparations of that metal, as hereinafter mentioned, with sulphur, which is perfectly elastic, impermeable to air or water, unchangeable in extreme temperatures, preserving its color without "bloom," and free from the deadly action upon the constitution and health hitherto experienced by the operatives employed in the preparation of metallic or vulcanized rubber.

To enable others skilled in the manufacture of rubber and its compound to use our invention, we will proceed to describe the method of mixing and preparing same.

We take, say, fifty-six pounds of caoutchouc, rendered plastic by the usual solvents, or by the combined action of heat and grinding in the machines ordinarily used for that purpose in rubber-works, and gradually add thereto, while masticating, fifty-six pounds of carbonate of zinc, commonly called "*Lapis calaminaris*," and finally mixing therewith three pounds eight ounces of sulphur, the whole to be well kneaded and incorporated. When we wish to impart color to our composition, as is sometimes necessary in the manufacture of certain descriptions of goods, we add in compounding as much lamp-black, ocher, or other coloring matter as will produce the required result. The mass is then ready to be manufactured into sheets, waterproof cloths, shoes, or such other articles as may be required. We afterward submit the same to a high degree of artificial heat, from 280° Fahrenheit to 300°, placing such goods in an oven or chamber heated by ordinary fuels, or in a receptacle in which the temperature is raised by steam, continuing them in that state from two to six hours, according to the thickness or bulk of the articles to be heated or "cured," which latter process is well known to all manufacturers of metallic rubber.

We do not wish to confine ourselves to the precise proportions above mentioned, as we frequently vary the same, according to the requirements of the article into which it is manufactured, decreasing the quantity of carbonate of zinc when a greater elasticity is wanted, and increasing the same when toughness and ductility only are the requisites. Neither do we at all times grind sulphur in with our composition, but soak the gum in turpentine, or camphene saturated with sulphur; or we merely dust the surface of the manufactured article with sulphur previously to being heated, as above mentioned, and the desired effect will also be produced by introducing the vapor of sulphur, under steam or atmospheric pressure, into the heated chamber in which the goods are placed, all of which matter of detail respecting the manner of introducing sulphur into our composition forms no part of our claim, such method being daily in use by manufacturers of metallic or vulcanized combinations.

We do not wish to confine ourselves to the use of *Lapis calaminaris* in forming our improved fabric, as we produce a good effect by the use of the oxide, sulphuret, carbonate, and other salts of zinc.

We here disclaim the use of rubber and sulphur alone, as also the submitting of rubber or rubber compounds to a high degree of heat. Neither do we wish to secure the rights of coloring rubber, such having frequently been done by rubber-manufacturers; but What we do claim as our invention, and desire to secure by Letters Patent, is—

India-rubber fabrics made by the combination of caoutchouc in its several varieties with zinc compounds in their several forms, as herein set forth, and sulphur, and in combination with these the submitting our compound to the action of a high degree of heat, the whole being combined and manufactured substantially as above described.

H. G. TYER.
JOHN HELM.

Witnesses:
R. R. ROLLO, Jr.,
A. A. SNODGRASS.